United States Patent Office

3,542,886
Patented Nov. 24, 1970

3,542,886
CATALYST RECYCLE
Ronald D. Bushick, Glen Mills, Pa., assignor to Sun Oil Company, Philadelphia, Pa., a corporation of New Jersey
No Drawing. Filed Oct. 18, 1968, Ser. No. 768,898
Int. Cl. C07c 5/24
U.S. Cl. 260—666                                    6 Claims

ABSTRACT OF THE DISCLOSURE

A method for preparing decahydronaphthalenes from dicyclic naphthenes wherein the reaction takes place in the presence for a $SbF_5$ catalyst and either a HF or $HSO_3F$ co-catalyst for a period of at least about 80 minutes before recycling the catalyst for subsequent reactions.

---

This invention relates to the recycle of a catalyst system, and more particularly, a catalyst system used for the isomerization of saturated dicyclic systems.

Decahydronaphthalene (Decalin) and its alkyl-substituted homologues generally have been prepared by the hydrogenation of naphthalenes of corresponding structures. Recently, as described by Schneider in U.S. Patent Nos. 3,219,718 and 3,243,469, it has been discovered that decahydronaphthalenes can be prepared by the isomerization of dicyclic naphthenes having two cyclic rings utilizing an aluminum halide-hydrogen halide catalyst. Preferably, the catalyst is a liquid complex obtained by reacting the aluminum halide and hydrogen halide catalyst in the presence of a paraffin hydrocarbon. Various dicyclic naphthenes having 12 to 20 carbon atoms, when reacted in the presence of the aforesaid catalyst at a temperature in the range of $-20°$ to $70°$ C., will rearrange to form decahydronaphthalenes having the same empirical formula as the dicyclic naphthene charged.

As disclosed in a copending application Ser. No. 678,509, superior yields of the mixed decahydronaphthalenes can be obtained through the use of a catalyst system consisting of $SbF_5$ and a co-catalyst of either HF or $HSO_3F$. Preferably, the catalysts are HF and $SbF_5$. This catalyst system enables one to obtain a final product distribution comparable to the complex catalyst system aforementioned, yet superior to the simple aluminum halide-hydrogen halide system. Further, the catalyst of the disclosed invention is more efficient than the previously employed complex system in that it does not require the presence of an olefin and thus eliminates the possible alkylation of the dicyclic naphthenes. This alkylation reaction tends to act in competition with the isomerization and inherently decreases the amount of final product obtained.

As a further embodiment of my previous invention, it had been found that the catalyst was particularly effective in isomerizing dicyclic naphthenes having 12 carbon atoms to an equilibrium mixture of dimethyldecahydronaphthalene which is relatively rich in 2,6-dimethyldecahydronaphthalene. The 2,6 isomer can subsequently be separated, particularly by fractional crystallization, dehydrogenated, and then oxidized to produce the 2,6-dicarboxylic acid. This acid is a highly desirable commercial product which in previous years has been difficult to produce due to a limited source of the 2,6-dimethylnaphthalene isomer.

The hydrocarbon charge for the disclosed catalyst could be any uncondensed dicyclic naphthene having 13 to 20 carbon atoms and two cyclohexyl rings or any $C_{12}$ dicyclic naphthene regardless of its precise structure, wherein the naphthene rings of said $C_{12}$ compounds can be either condensed or noncondensed and any alkyl substituent or substituents can be included that would result in the naphthene having 12 carbon atoms. The following are examples of suitable starting dicyclic naphthenes: dimethyldecahydronaphthalenes, ethyldecahydronaphthalenes, trimethylhydrindanes, ethylmethylhydrindanes, dimethylbicyclopentyls, 1,2-bicyclopentylethane, dicyclohexyl, dicyclohexylmethane, dimethyl dicyclohexyls, 3',3-diethyl dicyclohexylmethane, etc.

It has now been discovered that it is possible to reuse or recycle the catalyst system comprising HF or $HSO_3F$ and $SbF_5$ while maintaining a 90% conversion of the subsequent reactants when the catalyst is exposed to a minimum reaction time of approximately 80 minutes. Preferably, the reaction is carried out for a period of 90 to 110 minutes. The significance of this ability to recycle while maintaining high conversion rates can be readily appreciated when one considers the problems currently encountered in the industry today with similar catalysts whether gaseous or liquid in nature.

The recycle of catalyst systems, such as the well-known $HF-BF_3$ system, has proven to be very difficult. The recycle of an $HF-BF_3$ catalyst system requires the removal of $HF-BF_3$ from the reaction vessel by distillation in order to free the hydrocarbon from the acid-hydrocarbon complex. Attempts to remove only the hydrocarbon layer and recycle the $HF-BF_3$, which contains a certain quantity of basic structures as their conjugate acids, generally results in a low conversion of hydrocarbon to the desired product or products. Low conversions also result when attempting to recycle other catalysts.

In accordance with the invention, one or more dicyclic naphthenes as described above are reacted in the presence of a catalyst system comprising HF or $HSO_3F$ and $SbF_5$ at a temperature in the range of $-10°$ to $70°$ C., preferably $0°$ to $20°$ C. The reaction is allowed to continue for a period of at least 80 minutes, preferably 90 to 110 minutes. The reaction proceeds immediately, and a nonequilibrium product can be obtained in 5 to 20 minutes; and at the preferred lower temperatures, an equilibrium product will be obtained in approximately one hour. However, it is not the time required to establish equilibrium products which is critical, but rather the desired time for reaction is based on the buildup of carbonium ions such that there is an acid equilibrium involving the carbonium ions generated from the dicyclic naphthenes and their corresponding decahydronaphthalene products. The time lag until the recycle time is reached is due to an insufficient carbonium ion concentration.

Once the carbonium ion concentration has been built up on the catalyst through the original reaction, the hydrocarbon products can be separated from the catalyst layer and the catalyst recycled for subsequent reaction. All subsequent reactions with the recycled catalyst will reach a 90% conversion in a relatively shorter period of time. Generally, a period of 30 to 70 minutes is sufficient for a substantial conversion of the dicyclic compound to take place, although the reaction will proceed immediately. If the original reaction is carried out for less than 80 minutes, then there will be an insufficient carbonium ion concentration, and subsequent reactions will convert less and less of the reactants to the desired product within a reasonable time.

The lower reaction temperatures are preferred because the possibility of side reactions is enhanced at the higher temperatures. As aforementioned, rearrangement of the starting naphthene rapidly occurs, and decahydronaphthalene having the same number of carbon atoms as the dicyclic naphthene charged is formed in high yield. A small amount of by-products, such as monomethyldecahydronaphthalene, and unidentified $C_{12}$ compounds which may be precursors to the decahydronaphthalene formation are generally formed. The ratio of HF or $HSO_3F$ to charge is operable in the range of 1:1 to 100:1, and preferably a ratio of 3:1 to 20:1 is employed. The ratio of $SbF_5$ to charge is operable in the range of 0.1:1 to 5:1, but preferably 0.1:1 to 1:1.

In order that those skilled in the art may more fully comprehend the nature of my invention and its mode of operation, I present the following examples.

EXAMPLE I

The catalyst was prepared by mixing 0.17 moles of $HSO_3F$ with 0.05 mole of $SbF_5$. The catalyst and 0.05 moles of dicyclohexyl were added to a rocker bomb, and the mixture was shaken at a temperature of 10° C. for 90 minutes. The hydrocarbon phase was separated from the catalyst layer, washed first with a carbonate solution and then with water, and subsequently analyzed by vapor phase chromatography. The product was composed of approximately 88% by weight dimethyldecahydronaphthalene and approximately 9% by weight ethyldecahydronaphthalene, with 100% of the dicyclohexyl being converted. The catalyst was recycled, and dicyclohexyl was added to maintain the same mole ratio as initially employed. This reaction was carried out for 60 minutes at 10° C., and approximately 92% by weight of the product were ethyl- and dimethyldecahydronaphthalenes, with 97% of the dicyclohexyl being converted.

EXAMPLE II

The same procedure and conditions as set forth in Example I are employed; however, the catalyst is $HF-SbF_5$ and the dicyclohexyl: $HF:SbF_5$ mole ratios are 0.05:0.05:0.028. The reaction is carried out at 0° C. for 90 minutes, and approximately 94% conversion of the dicyclohexyl to decahydronaphthalenes results. When the catalyst is recycled from this point while maintaining the initial mole ratios employed, substantial conversion of the dicyclohexyl is again observed.

As aforementioned, it is necessary that the initial reaction be carried out for a period of at least 80 minutes so that sufficient carbonium ions are generated to maintain the continuation of the reaction. If the catalyst is not given this exposure, there will be a substantial loss of activity and subsequently a lower conversion to products.

When the hydrocarbon charge is a $C_{12}$ dicyclic naphthene, such as dicyclohexyl in Examples I and II, the 2,6-dimethyldecahydronaphthalenes formed can be selectively crystallized and subsequently dehydrogenated to form 2,6-dimethylnaphthalene, employing the method as described by Schneider in U.S. Pat. No. 3,243,469. As aforementioned, this 2,6-dimethylnaphthalene can be converted easily to the highly desirable dicarboxylic acid.

As stated previously, various dicyclic naphthalenes can be employed in this invention. The following are examples of said naphthenes and the products obtained therefrom:

dicyclohexyl methane → trimethyl decahydronaphthalenes
dimethyl dicyclohexyls → tetramethyl decahydronaphthalenes
dicyclohexyl ethanes → tetramethyl decahydronaphthalenes While the particular methods of application described herein are well adapted to meet the objects of the present invention, various modifications or changes may be resorted to without departing from the scope of the invention as defined in the claims.

I claim:
1. A method for the preparation of decahydronaphthalenes wherein the catalyst consists of $SbF_5$ and a co-catalyst selected from the group consising of HF and $HSO_3F$ which comprises the steps of:
   (a) reacting a dicyclic naphthene selected from the group consisting of dicyclic naphthenes having 12 carbon atoms and uncondensed dicyclic naphthenes having 13 to 20 carbon atoms and 2 cyclohexyl rings at a temperature in the range of −10° to 70° C. in the presence of said catalyst for a period of at least about 80 minutes to produce decahydronaphthalene,
   (b) separating the hydrocarbon product from the catalyst, and
   (c) contacting the separated catalyst with a dicyclic naphthene at a temperature in the range of −10° to 70° C. to produce decahydronaphthalenes.
2. A method as described in claim 1 wherein the original reaction takes place for a period of from 90 to 110 minutes.
3. A method as described in claim 1 wherein the dicyclic naphthene is allowed to react with the recycled catalyst for a period of from 30 to 70 minutes.
4. A method as described in claim 2 wherein the dicyclic naphthene is allowed to react with the recycled catalyst for a period of from 30 to 70 minutes.
5. A method as described in claim 1 wherein the catalyst is present in the ratio of 1:1 to 100:1 $SbF_5$ to dicyclic naphthene and 0.1:1 to 5:1 co-catalyst to dicyclic naphthene.
6. A method as described in claim 1 wherein the reactions take place at a temperature in the range of 0° to 20° C.

References Cited

UNITED STATES PATENTS 3,200,161    8/1965    Suld et al. _____ 260—688 XR

DELBERT E. GANTZ, Primary Examiner

C. R. DAVIS, Assistant Examiner

U.S. Cl. X.R.

260—668